(12) United States Patent
Xu et al.

(10) Patent No.: US 11,970,420 B2
(45) Date of Patent: Apr. 30, 2024

(54) MOLDING DEVICE AND MOLDING METHOD FOR OPTICAL FIBER PREFORM

(71) Applicant: CHINA JILIANG UNIVERSITY, Hangzhou (CN)

(72) Inventors: Shiqing Xu, Hangzhou (CN); Youjie Hua, Hangzhou (CN); Bingpeng Li, Hangzhou (CN); Ying Tian, Hangzhou (CN); Feifei Huang, Hangzhou (CN); Junjie Zhang, Hangzhou (CN); Muzhi Cai, Hangzhou (CN); Renguang Ye, Hangzhou (CN)

(73) Assignee: CHINA JILIANG UNIVERSITY, Hangzhou (CN)

( * ) Notice: Subject to any disclaimer, the term of this patent is extended or adjusted under 35 U.S.C. 154(b) by 123 days.

(21) Appl. No.: 17/806,687

(22) Filed: Jun. 13, 2022

(65) Prior Publication Data
US 2023/0312391 A1 Oct. 5, 2023

(30) Foreign Application Priority Data

Mar. 30, 2022 (CN) .......................... 202210326681.5

(51) Int. Cl.
*C03B 37/012* (2006.01)
*C03B 25/02* (2006.01)
(52) U.S. Cl.
CPC ........ *C03B 37/01274* (2013.01); *C03B 25/02* (2013.01); *C03B 37/01268* (2013.01); *C03B 37/01271* (2013.01); *C03B 37/01265* (2013.01)

(58) Field of Classification Search
CPC ........ C03B 37/01274; C03B 37/01271; C03B 37/01268; C03B 19/04; C03B 37/012
See application file for complete search history.

(56) References Cited

U.S. PATENT DOCUMENTS 4,519,826 A * 5/1985 Tran .................. C03B 37/01268
385/124
4,729,777 A * 3/1988 Mimura ............ C03B 37/01274
65/425

(Continued)

FOREIGN PATENT DOCUMENTS

CN 101492248 A * 7/2009 ....... C03B 37/01268
CN 201321430 Y * 10/2009

(Continued)

OTHER PUBLICATIONS

First Office Action of Chinese Application No. 202210326681.5, State Intellectual Property Ofice of People's Republic of China, Aug. 30, 2023 (Year: 2023).*

*Primary Examiner* — Alison L Hindenlang
*Assistant Examiner* — Steven S Lee
(74) *Attorney, Agent, or Firm* — Kinney & Lange, P.A.

(57) ABSTRACT

A molding device and a molding method for an optical fiber preform are provided. The molding device includes a rotating mechanism, an extrusion mechanism, and a cylinder mold that is of a cylindrical structure with two ends each having an opening. After a hollow cladding sleeve is obtained by rotating the cylinder mold through the rotating mechanism, a molten core glass is then reversely extruded into the cladding sleeve in the cylinder mold from bottom to top by the extrusion mechanism to prepare the optical fiber preform.

7 Claims, 1 Drawing Sheet

(56) References Cited

U.S. PATENT DOCUMENTS

| | | | | |
|---|---|---|---|---|
| 4,925,475 A | * | 5/1990 | Mimura | C03B 37/01268 65/153 |
| 5,055,120 A | * | 10/1991 | Tran | C03B 37/027 65/432 |
| 5,160,521 A | * | 11/1992 | Tran | C03B 37/01271 65/41 |
| 5,185,021 A | * | 2/1993 | Miura | C03B 37/01274 65/102 |
| 5,308,371 A | * | 5/1994 | Kawamoto | C03C 3/325 65/102 |
| 5,312,471 A | * | 5/1994 | Jung | C03B 5/025 65/335 |
| 5,656,056 A | * | 8/1997 | Braglia | C03B 37/02754 65/382 |
| 5,779,756 A | * | 7/1998 | Chiquet | C03B 37/01268 65/145 |
| 6,053,012 A | * | 4/2000 | Itoh | C03B 37/01274 65/435 |
| 6,405,566 B1 | * | 6/2002 | Oh | C03B 37/01248 65/412 |

FOREIGN PATENT DOCUMENTS

| | | | | | |
|---|---|---|---|---|---|
| CN | 107311444 A | * | 11/2017 | | C03B 37/01274 |
| CN | 105366935 B | * | 3/2018 | | C03B 37/01268 |
| CN | 107804965 A | * | 3/2018 | | |
| CN | 112159095 A | * | 1/2021 | | |
| JP | H08188434 A | * | 7/1983 | | C03B 37/01268 |
| JP | S58125630 A | * | 7/1983 | | C03B 37/01268 |
| JP | S6121175 B2 | * | 5/1986 | | G01N 21/251 |
| JP | S6245181 B2 | * | 9/1987 | | |
| JP | 63011534 A | * | 1/1988 | | C03B 37/01268 |
| KR | 20030012939 A | * | 2/2003 | | |

* cited by examiner

MOLDING DEVICE AND MOLDING METHOD FOR OPTICAL FIBER PREFORM

CROSS REFERENCE TO RELATED APPLICATION

This patent application claims the benefit and priority of Chinese Patent Application No. 202210326681.5, entitled "Molding Device and Molding Method for Optical Fiber Preform" filed on Mar. 30, 2022, the disclosure of which is incorporated by reference herein in its entirety as part of the present application.

TECHNICAL FIELD

The present disclosure relates to the field of manufacturing of optical fiber preforms, and in particular relates to a molding device and a molding method for an optical fiber preform.

BACKGROUND

Mid-infrared optical fibers have significant scientific values and application needs in the fields of LIDAR, laser medical treatment, food quality control, air pollution monitoring and the like, and have gained wide attention in recent years. Due to the limitation of the infrared cut-off wavelength of the quartz glass, the mid-infrared optical fibers can only use the multi-component glass to be its base material, and the fibers mainly are fluoride optical fibers, tellurite optical fibers and chalcogenide optical fibers at present. The key technology of an optical fiber manufacturing process is a preparation technology of an optical fiber preform. At present, the common preparation methods of the multi-component glass optical fiber preform mainly include a rod-in-tube method, an extrusion method, and a rotational pouring method.

The rod-in-tube method is such a method that a cladding sleeve and a core rod are prepared by performing cold processing on the pre-prepared large-size block glass, such as cutting, drilling, grinding, and polishing; and then the core rod is inserted into the cladding sleeve to obtain the optical fiber preform. This method requires high optical quality of the block glass as well as working accuracy, whereas gaps may also exist between the cladding sleeve and the core rod. Therefore, the fiber prepared by this method has more interface defects and this method is not suitable for brittle glass with poor mechanical strength.

The extrusion method is such a method that cladding glass and core glass are simultaneously extruded into a mold in a top-down manner when the glass is in a high viscosity state, thus preparing the optical fiber preform. The optical fiber preform with relatively uniform core diameter and ideal interface can be obtained through this method. An extrusion device and an extrusion method for extruding a chalcogenide glass optical fiber perform using superposition method are disclosed by Chinese patent CN103466933B, and an extrusion method and an extrusion device for adjusting a core-cladding ratio of an optical fiber preform are disclosed by Chinese patent CN105271696B. As glass ingots are needed to be prepared in advance, these two methods are more suitable for preparing the chalcogenide glass fiber preforms, which can be well linked to the melting of the chalcogenide glass. However, for other non-chalcogenide mid-infrared optical fibers, an additional process for glass ingot manufacturing is added in these two methods, the requirement for the optical quality of the glass ingot is high, and the extrusion device is relatively complex. An extrusion device and a preparation method for an optical fiber preform are disclosed by Chinese patent CN107311444B. The preparation method is such a method that the high-temperature glass melt is directly poured into a low-temperature mold subsequently for extrusion molding after cladding glass and core glass are molten. This method is particularly simple and convenient, and the device is also simple. However, as the heat conductivity of the glass is very low, during extrusion, the molten glass has the low viscosity in its center, and has the high viscosity in its edges in a unsolidified state. So, only the small-size optical fiber preform may be prepared using this method due to non-uniformity of the glass viscosity.

The rotational pouring method is such a method that a molten cladding glass is poured into a mold with a heating jacket to manufacture a cladding sleeve through a high-speed rotational centrifugal force, and then a molten core glass is poured into the hollow cladding sleeve to prepare an optical fiber preform. The optical fiber preform manufactured by this method has the optimal core diameter uniformity. However, a large caliber of the cladding sleeve must be reserved in this method, otherwise the inlet of the cladding sleeve is easy to be blocked when the molten core glass is poured, thus making the adjustable range of the core/cladding ratio of the preform smaller. In addition, as the impact bubbles and the interface striae are easy to be generated by the impact force caused by the vertical downward flow of the molten core glass in the pouring process, the requirement on the operator is high, and the yield is low.

SUMMARY

The embodiments aim to provide a molding device and a molding method for an optical fiber preform to solve the problems in the prior art. The molding device and the molding method have the advantages of being low in production cost, short in period, simple in device, and simple and convenient to operate. More importantly, the optical fiber preform with uniform core diameter, wide core/cladding ratio adjustable range, ideal interface, and no bubbles and striae can be obtained.

To achieve the purpose, the present disclosure provides the following solutions. A molding device for an optical fiber preform is provided by the present disclosure, which includes a rotating mechanism, an extrusion mechanism, and a cylinder mold for preparing a hollow cladding sleeve, wherein the cylinder mold is of a cylindrical structure with two ends each having an opening, a corresponding one of two detachable plugging portions of the rotating mechanism is fitted with the opening, and the cylinder mold is rotationally connected to the rotating mechanism through the two plugging portions.

The extrusion mechanism includes a top die, an extrusion head and a bottom die. The top die is detachably connected to a first end of the two ends which is a top end of the cylinder mold vertically arranged, and the top die is formed with a through portion enabling a molten core glass inside the cladding sleeve to flow out. The extrusion head is located at a second end of the two ends which is a bottom end of the cylinder mold vertically arranged, and is provided with a feeding channel in communication with the cladding sleeve. The bottom die for pressing the molten core glass into the feeding channel is arranged at an inlet of the feeding channel. A heat resisting cylinder is provided between the extrusion head and a bottom end of the cladding sleeve. The heat resisting cylinder is formed with a flow guide channel for communicating the feeding channel and the cladding sleeve.

In some embodiments, the cylinder mold may be connected to the rotating mechanism, and a heating jacket may be arranged at a periphery of the cylinder mold.

In some embodiments, the cylinder mold may be connected to the rotating mechanism, and an end cylinder coaxial with the cylinder mold may be arranged at an inner side of the cylinder mold. An outer diameter of the end cylinder may be matched with an inner diameter of the cylinder mold.

In some embodiments, the cylinder mold may be connected to the extrusion mechanism, and an annular gasket coaxial with the cylinder mold may be arranged at an inner side of the top end of the cylinder mold. The annular gasket may have same inner and outer diameters as the end cylinder. The annular gasket may be sleeved outside a narrow protrusion structure molded at an inner side of the end cylinder. The top die may abut against the annular gasket.

In some embodiments, an outer diameter of the heat resisting cylinder may be matched with the inner diameter of the cylinder mold. The flow guide channel and the cladding sleeve may be coaxial and have same inner diameters.

In some embodiments, an inlet end of the feeding channel may be arranged downwards. The bottom die may be of a groove-shaped structure having an opening facing upwards. An open end of the groove-shaped structure may be slidingly sleeved outside a peripheral side of the inlet end of the feeding channel in a vertical direction.

In some embodiments, the inlet end of the feeding channel may be of a tapered structure diminishing from bottom to top.

In some embodiments, a profile of a narrow end of the tapered structure may be matched with an inner cavity of the cylinder mold and may be inserted into the inner cavity of the cylinder mold. The narrow end of the tapered structure may have a same inner diameter as the cladding sleeve.

In some embodiments, the rotating mechanism may include two driving shafts which may be located at the two ends of the cylinder mold respectively and may be provided coaxial with the cylinder mold. Each of the two plugging portions may include two annular flanges which may be respectively provided on the cylinder mold and a corresponding one of the two driving shafts. The two annular flanges may be detachably and hermetically connected through an annular fastener.

A molding method for an optical fiber preform is further provided, which includes:

preparing: enabling a cylinder mold to pass through a heating jacket, connecting and fixing a first end of the cylinder mold to a first driving shaft of two driving shafts through a first annular fastener, and placing an end cylinder in the cylinder mold, turning on the heating jacket, performing heat preservation at 200-350° C. for 0.5-1 h, and placing a second driving shaft of the two driving shafts in an electric furnace for heat preservation at 200-350° C. for 0.5-1 h;

melting: melting cladding glass and core glass successively in a melting furnace, wherein the cladding glass is weighed quantitatively based on a core diameter of the optical fiber preform;

pouring the molten cladding glass: placing the cylinder mold with an opening at a second end of the cylinder mold facing upwards vertically after the first end of the cylinder mold is connected and fixed, pouring the molten cladding glass into the cylinder mold, taking out the second driving shaft, and connecting and fixing the second driving shaft to the second end of the cylinder mold through a second annular fastener;

rotating: maintaining the cylinder mold and the two driving shafts in a vertical state, and rotating the two driving shafts at a rotational speed of 3000 r/min, waiting for 5-10 s and laying the cylinder mold and the two driving shafts stably, continuing to keep the cylinder mold for heat preservation at 200-350° C., and turning off the heating jacket to enable the cylinder mold to be cool naturally after the cylinder mold is rotated for 3-60 min, wherein, upon rotation of the cylinder mold, a bottom die and an extrusion head are put into the electric furnace for heat preservation at 400-600° C. for 0.5-1 h in advance;

mounting an annular gasket and a heat resisting cylinder: dismounting the first annular fastener and the second annular fastener at two sides of the cylinder mold, taking out the cylinder mold and placing the cylinder mold horizontally, pushing a cladding sleeve to the first end of the cylinder mold to replace the end cylinder with the annular gasket and enabling the annular gasket align with the first end of the cylinder mold, cutting off a narrow protrusion structure of the cladding sleeve to ensure that two ends of the cladding sleeve are of opening structures; and placing the heat resisting cylinder in the second end of the cylinder mold, and then placing the cylinder mold as a whole in the electric furnace for heat preservation at 200-450° C. for 0.5-1 h;

mounting a top die, the extrusion head and the bottom die: taking out the bottom die from the electric furnace, pouring the molten core glass into the bottom die, taking out the extrusion head from the electric furnace and mounting the extrusion head on the bottom die, and taking out the cylinder mold and enabling the first end of the cylinder mold which is provided with the annular gasket to face upwards, placing the cylinder mold wholly and vertically, mounting the extrusion head at the second end which is a bottom end of the cylinder mold, and placing the top die at the first end which is a top end of the cylinder mold;

extruding: transferring the cylinder mold installed with the top die, the extrusion head and the bottom die to a hydraulic machine, turning on the hydraulic machine and setting an extrusion speed to be 0.4-5 mm/s; extruding the molten core glass reversely into the cladding sleeve stably; stopping extruding in response to observation through the top die that the molten core glass overflows; remaining a position of the hydraulic machine unchanged, waiting for 30-300 s and taking out the cylinder mold; and transferring the cylinder mold into the electric furnace to be annealed for 3-6 h, and cooling the cylinder mold to room temperature in the electric furnace; and taking out a product: disassembling the cylinder mold and taking out the optical fiber preform.

Compared with the prior art, the embodiments obtain the following technical effects.

First, compared with the traditional rotational pouring method, the molding device of the present disclosure includes a rotating mechanism, an extrusion mechanism and a cylinder mold that is of a cylindrical structure with two ends each having an opening. After a hollow cladding sleeve is obtained by rotating the cylinder mold through the rotating mechanism, a molten core glass is then extruded into the cladding sleeve in the cylinder mold by the extrusion mechanism to prepare the optical fiber preform. On the one hand, the advantages of a rotational pouring method are inherited, the optical fiber preform with a uniform core diameter and an ideal interface can be obtained. On the other hand, the pouring process of the molten core glass is replaced with a mode of extruding the molten core glass into the cladding sleeve, thus the limitation on a caliber of the cladding sleeve in the pouring process is removed. In this way, the degree of freedom of the setting of the core diameter is higher, the core diameter can be set as fine as 4 mm, and the adjustable range of the core/cladding ratio is widened. Moreover, the time required for cooling the molten core glass from a high-temperature molten state to a solidification state can be shortened in a case where the core diameter is thinner, which inhibits a crystallization phenomenon of the mid-infrared glass to a certain extent. Further, the adverse effects that impact bubbles and interface striae are generated by an impact force caused by the vertical downward flow of the molten core glass in the pouring process are eliminated, thus the obtained optical fiber preform is high in yield and free of bubbles and striae.

Compared with the traditional extrusion method, the extrusion mechanism of the present disclosure includes a top die, an extrusion head and a bottom die. The top die is detachably connected to the top end of the cylinder mold vertically arranged. The top die is provided with a through portion enabling the molten core glass at the inner side of the cladding sleeve to flow out. The extrusion head is located at the bottom end of the cylinder mold vertically arranged and is provided with a feeding channel for the molten core glass. The bottom die for pressing the molten core glass into the feeding channel is arranged at the inlet of the feeding channel. A heat resisting cylinder is provided between the extrusion head and the bottom end of the cladding sleeve. The heat resisting cylinder is provided with a flow guide channel for communicating the feeding channel and the cladding sleeve. As described above, the difference from a top-down extrusion mode under gravity in a traditional extrusion method is that, the extrusion mechanism with the extrusion head arranged below is provided in the present disclosure, and the molten core glass is extruded into the cladding sleeve in a reverse extrusion mode from bottom to top to prepare the optical fiber preform. According to such an extrusion mode, the phenomenon of material blockage caused by the free dripping of the molten core glass in the mounting process of the extrusion device can be avoided, the operation difficulty is greatly reduced, and the molten core glass may be stably and rapidly extruded into the cladding sleeve, thus the yield and the quality of the optical fiber preform are further improved.

Second, the extrusion process of the molten core glass needs a through cladding sleeve. However, the cladding sleeve obtained by rotating the cylinder mold through the rotating mechanism is of a structure with one end closed, so the molten core glass cannot be directly extruded into the cladding sleeve, and subsequent extrusion can be conducted only by cutting or drilling the closed end of the cladding sleeve. The operation is difficult, and impurities and scraps may be generated to pollute an inner surface of the cladding sleeve, thus resulting in a poor interface of the optical fiber preform. According to the disclosure, the end cylinder coaxial with the cylinder mold is arranged at the inner side of the cylinder mold, and the outer diameter of the end cylinder is matched with the inner diameter of the cylinder mold. When the molten cladding glass is poured, the end cylinder may slide to the bottom end along the inner wall of the cylinder mold vertically arranged, and the cladding sleeve may be prepared through the rapid rotation. A narrow protrusion structure is formed at a portion, corresponding to the end cylinder, of the obtained cladding sleeve. Therefore, those skilled in the art can easily cut off the narrow protrusion structure to have a hollow passage of the cladding sleeve. This procedure is small in damage, the inner surface of the cladding sleeve is not be polluted, and the cladding sleeve is not be damaged due to the brittleness of the glass material, thus the integrity of a main body structure of the cladding sleeve is guaranteed.

Third, the annular gasket coaxial with the cylinder mold is arranged at the inner side of the top end of the cylinder mold during extrusion. Further, the inner diameter and the outer diameter of the annular gasket are the same as those of the end cylinder. The annular gasket is sleeved outside the narrow protrusion structure molded at the inner side of the end cylinder. The top die abuts against the annular gasket. Accordingly, when the whole device is placed on a hydraulic machine for extrusion, the annular gasket uses as the buffer between the cladding sleeve and the top die, thus preventing a hydraulic force during extrusion from damaging the cladding sleeve.

BRIEF DESCRIPTION OF THE DRAWINGS

To illustrate the technical solutions in the embodiments of the present disclosure or in the prior art more clearly, the drawings used in the embodiments will be briefly described below. Apparently, the drawings in the following description show merely some embodiments of the present disclosure, and a person of ordinary skill in the art may still obtain other drawings from these drawings without creative efforts.

Figure 1:
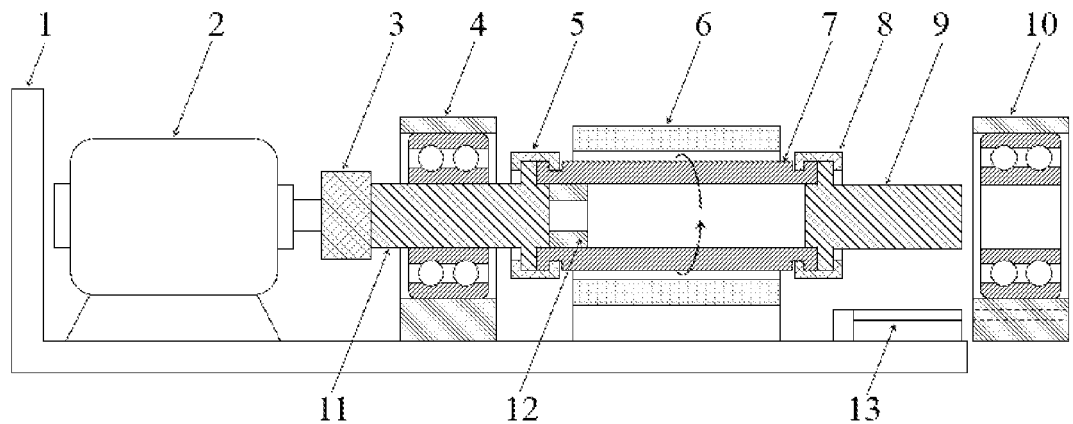
FIG. 1 is a structure diagram of connecting a cylinder mold to a rotating mechanism according to the present disclosure.

List of the reference characters: 1 right-angle base; 2 driving motor; 3 coupling; 4 left bearing; 5 left annular fastener; 6 heating jacket; 7 cylinder mold; 8 right annular fastener; 9 right rotating shaft; 10 right bearing; 11 left rotating shaft; 12 end cylinder; 13 sliding rail; 14 cladding glass; 15 annular gasket; 16 heat resisting cylinder; 17 top die; 18 core glass; 19 extrusion head; and 20 bottom die.

DETAILED DESCRIPTION OF EMBODIMENTS

The technical solutions in the embodiments of the present disclosure are described clearly and completely below with reference to the drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The embodiments aim to provide a molding device and a molding method for an optical fiber preform to solve the problems in the prior art. The molding device and molding method have the advantages of being low in production cost, short in period, simple in device, and simple and convenient to operate. More importantly, the optical fiber preform with uniform core diameter, wide core/cladding ratio adjustable range, ideal interface, and no bubbles and stripes can be obtained.

To make the above-mentioned purpose, features and advantages of the present disclosure more understandable, the present disclosure is further described in detail below with reference to the drawings and specific embodiments.

Figure 2:
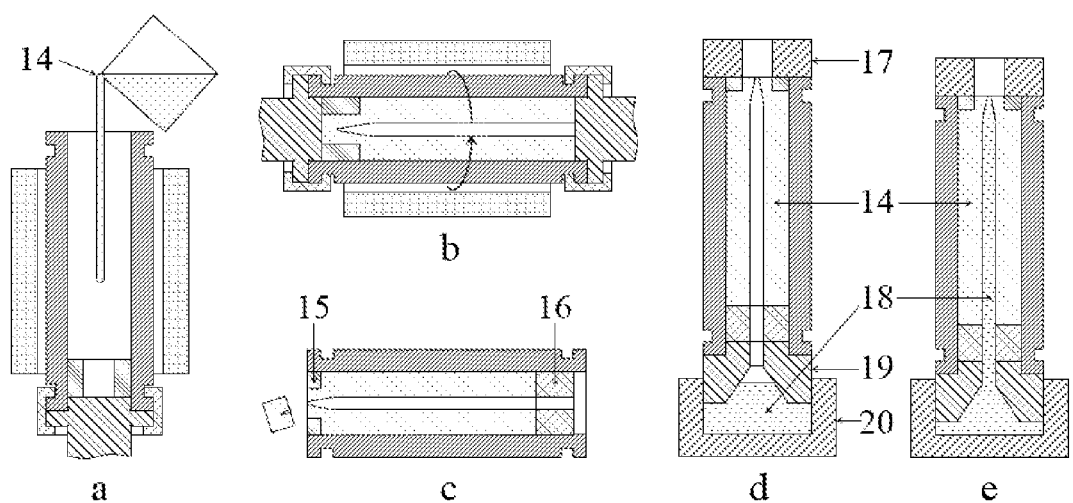
FIG. 2 is a diagram of steps of preparing an optical fiber preform according to the present disclosure.

Referring to FIG. 1 to FIG. 2, a molding device for an optical fiber preform is provided in this embodiment, which includes a rotating mechanism, an extrusion mechanism, and a cylinder mold 7 for preparing a hollow cladding sleeve. The cylinder mold 7 is of a cylindrical structure with two ends each having an opening. An inner diameter of the cylinder mold determines the size of the optical fiber preform. Two openings of the cylinder mold are provided with detachable plugging portions respectively. Each plugging portion adopts such as a metal plug to seal a corresponding opening, thus preventing a molten cladding glass 14 from overflowing from the cylinder mold 7 in the rotating process. The cylinder mold 7 is rotationally connected to the rotating mechanism through the two plugging portions, so as to rotationally machine the molten cladding glass 14 in the cylinder mold 7 into the cladding sleeve through the rotating mechanism.

Further, the extrusion mechanism includes a top die 17, an extrusion head 19, and a bottom die 20. The top die 17 is detachably connected to a first end of the two ends which is a top end of the cylinder mold 7 that is vertically arranged to prevent the cladding sleeve from axially moving along the cylinder mold 7 when a molten core glass 18 is extruded into the cladding sleeve. The top die 17 is provided with a through portion allowing the molten core glass 18 at an inner side of the cladding sleeve to flow out. For example, the top die 17 is of an annular structure and is provided with a round through hole perpendicular to an axle center of the top die 17 at a bottom of the top die 17, thus facilitating to observe the overflowing condition of the molten core glass 18 in the extrusion process. The extrusion head 19 is located at a second end of the two ends which is a bottom end of the cylinder mold 7 that is vertically arranged, and is provided with a feeding channel in communication with the cladding sleeve. The bottom die 20 for pressing the molten core glass 18 into the feeding channel is arranged at an inlet of the feeding channel. A heat resisting cylinder 16 is provided between the extrusion head 19 and a bottom end of the cladding sleeve. The heat resisting cylinder 16 is provided with a flow guide channel for communicating the feeding channel and the cladding sleeve. The heat resisting cylinder 16 is made of a metal material with low heat conductivity. During the extrusion process, the bottom die 20 is fixed onto a bottom plate of a hydraulic machine, a driving portion of the hydraulic machine abuts against the top die 17, and the cylinder mold 7 and the extrusion head 19 to descend together, thus completing the work of pressing the molten core glass 18 in the bottom die 20 into the cladding sleeve.

Compared with the traditional rotational pouring method, according to the disclosure, after the hollow cladding sleeve is obtained at the inner side of the cylinder mold 7 by rotating the cylinder mold 7 through the rotating mechanism, the molten core glass 18 is extruded into the cladding sleeve in the cylinder mold 7 by the extrusion mechanism to prepare the optical fiber preform. On the one hand, the advantages of the rotational pouring method are inherited, the optical fiber preform with uniform core diameter and ideal interface can be obtained. On the other hand, the pouring process of the molten core glass 18 is replaced with a mode of extruding the molten core glass 18 into the cladding sleeve, thus the limitation on a caliber of the cladding sleeve in the pouring process is removed. In this way, the degree of freedom of the setting of the core diameter is high, the core diameter can be set as fine as 4 mm, and the adjustable range of the core/cladding ratio is widened. Moreover, the time required for cooling the molten core glass 18 from a high-temperature molten state to a solidification state can be shortened in a case where the core diameter is thinner, which inhibits a crystallization phenomenon of the mid-infrared glass to a certain extent. Further, the adverse effects that impact bubbles and interface striae are generated by an impact force caused by the vertical downward flow of the molten core glass in the pouring process are eliminated, thus the obtained optical fiber preform is high in yield and free of bubbles and striae. Compared with the traditional extrusion method, the difference from the top-down extrusion mode under gravity adopted by the traditional extrusion method is that, the extrusion mechanism with the extrusion head 19 arranged below is provided by the present disclosure, and the molten core glass 18 is extruded into the cladding sleeve by using a reverse extrusion mode from bottom to top to prepare the optical fiber preform. According to such extrusion mode, the phenomenon of material blockage caused by the free dripping of the molten core glass 18 in the mounting process of the extrusion device can be avoided, the operation difficulty is greatly reduced, and the molten core glass 18 may be stably and rapidly extruded into the cladding sleeve, thus the yield and quality of the optical fiber preform are further improved.

Moreover, it needs to be further noted that the traditional rotational pouring method is such a method that the molten core glass is poured after forming the hollow cladding sleeve, and gravity is used as the driving force. If the caliber of the cladding sleeve is small and is equivalent to the size of the molten glass flowing down vertically, the material blockage phenomenon is likely to occur in the pouring process. Once the material blockage occurs, the hollow cladding sleeve cannot be dredged and fully poured under the action of gravity, while the high-temperature molten core glass is gradually cooled during this period. In conclusion, the cladding sleeve with small caliber cannot complete the pouring of the molten core glass. Therefore, the molten core glass is extruded into the cladding sleeve using an extrusion mode in the present disclosure, thus releasing the limitation on the caliber of the cladding sleeve in the pouring process. However, this requires that the molten core glass is in a high-temperature flow state with low viscosity, and short extrusion time. Under this condition, if a traditional extrusion mode from top to bottom is adopted, unnecessary troubles may occur due to the molten glass under the action of gravity. For example, after the device is constructed, in the pouring process of the molten core glass in the extrusion device, the molten core glass with low viscosity starts to spontaneously drip along the flow guide channel under the action of gravity and contacts the cladding sleeve with relatively low temperature before extrusion is started, and thus the flow guide channel is blocked due to the solidification of the core glass. Therefore, the reverse extrusion mode from bottom to top is adopted in the present disclosure. The direction of the extrusion force is opposite to the gravity direction, sufficient time is provided for preparation, and the extrusion time is short, so that the situation that the cladding sleeve is blocked due to the solidification is avoided.

Preferably, in order to prevent the high-temperature molten cladding glass 14 from being quenched and cracked after being in contact with the cylinder mold 7 due to the low temperature of the cylinder mold 7, when the cylinder mold 7 is connected to the rotating mechanism, a heating jacket 6 is arranged at a periphery of the cylinder mold 7. The heating jacket 6 is configured to conveniently preheat the cylinder mold 7 and a corresponding mechanism thereof.

As a preferred embodiment of the present disclosure, when the cylinder mold 7 is connected to the rotating mechanism, an end cylinder 12 coaxial with the cylinder mold 7 is arranged at an inner side of the cylinder mold 7. An outer diameter of the end cylinder 12 is matched with an inner diameter of the cylinder mold 7. The cylinder mold 7 is entirely arranged vertically after the first end of the cylinder mold 7 is plugged. In the pouring process of the molten cladding glass 14, as the molten cladding glass 14 is rapidly cooled and solidified when it is in contact with the plugging portion at the first end of the cylinder mold 7, the cladding sleeve at the first end of the cylinder mold 7 is of a closed structure. It is difficult to machine the cladding sleeve into a through structure, and it is possible to pollute an inner surface of the cladding sleeve even damage the cladding sleeve. Thus, the end cylinder 12 is provided to make a narrow protrusion structure be formed at the portion, corresponding to the end cylinder 12, of the cladding sleeve. In this way, those skilled in the art can cut off the narrow protrusion structure easily to have the hollow passage of the cladding sleeve.

Further, when the cylinder mold 7 is connected to the extrusion mechanism, an annular gasket 15 coaxial with the cylinder mold 7 is arranged at an inner side of the top end of the cylinder mold 7. An inner diameter and an outer diameter of the annular gasket 15 are the same as those of the end cylinder 12. The annular gasket 15 is sleeved outside the narrow protrusion structure molded at an inner side of the end cylinder 12. The top die 17 abuts against the annular gasket 15. When the whole device is placed on a hydraulic machine for extrusion, the annular gasket 15 uses as a buffer between the cladding sleeve and the top die 17 to prevent a hydraulic force in the extrusion process from damaging the cladding sleeve. The top die 17 is of an annular structure and is provided with a through hole perpendicular to the axle center of the top die 17 at the bottom of the top die 17, thus facilitating to observe the overflowing condition of the molten core glass 18 in the extrusion process. An outer diameter of the top die 17 is matched with an outer diameter of the cylinder mold 7. An inner diameter of the top die 17 is matched with an inner diameter of the annular gasket 15. Therefore, the top die 17 is abuts against the cylinder mold 7 under the action of the hydraulic machine to avoid excessive extrusion force on the cladding sleeve.

An outer diameter of the heat resisting cylinder 16 is matched with the inner diameter of the cylinder mold 7, and the flow guide channel and the cladding sleeve are coaxial and have the same inner diameter, thus the molten core glass 18 may flow stably when the molten core glass 18 is extruded into the cladding sleeve through the flow guide channel.

Further, an inlet end of the feeding channel is arranged downwards, the bottom die 20 is of a groove-structure with an opening facing upwards, and the open end of the groove-shaped structure is slidingly sleeved outside a peripheral side of the inlet end of the feeding channel in a vertical direction. In this way, the open end of the groove-shaped structure forms the sliding connection with the peripheral side of the inlet end of the feeding channel under the action of the hydraulic machine to complete the extrusion of the molten core glass 18. Preferably, as the feeding channel is formed in the extrusion head 19, a profile of the extrusion head 19 may be matched with an inner cavity structure of the bottom die 20, and the bottom die 20 is slidingly sleeved outside the extrusion head 19 in the vertical direction.

As a preferred embodiment of the present disclosure, the inlet end of the feeding channel is of a tapered structure diminishing from bottom to top. A narrow end of the tapered structure is sequentially communicated with the flow guide channel of the heat resisting cylinder 16 and the cladding sleeve. Through the arrangement of the tapered structure, the molten core glass 18 may be rapidly converged to the narrow end of the tapered structure, and the molten core glass 18 is stably extruded into the flow guide channel. Preferably, the narrow end of the tapered structure has the same inner diameter as the cladding sleeve. Preferably, the extrusion head 19 is further provided with a straight cylinder section which is arranged at the narrow end of the tapered structure. An inner diameter of the straight cylinder section is the same as the inner diameter of the cladding sleeve, thus preventing unstable flow caused by the change of the size of the flow channel.

Further, a profile of the narrow end of the tapered structure is matched with an inner cavity structure of the cylinder mold 7, and the narrow end of the tapered structure is inserted into the inner cavity of the cylinder mold 7, thus facilitating the coaxial arrangement of the narrow end of the tapered structure and the cladding sleeve.

Further, the rotating mechanism includes two driving shafts which are located at two ends of the cylinder mold 7 respectively and are arranged to be coaxial with the cylinder mold 7. The plugging portion includes annular flanges respectively provided on the driving shafts and the cylinder mold 7. Two annular flanges are detachably and hermetically connected through an annular fastener. so that each driving shaft can plug a corresponding one of the two ends of the cylinder mold 7 to make the cylinder mold 7 form a closed structure, thus preventing the molten glass from flowing out as well as driving the cylinder mold 7 to rotate. Each driving shaft and the cylinder mold 7 are coaxial to guarantee the rotating effect. Preferably, the rotating mechanism further includes a right-angle base 1. A driving motor 2 is arranged on the right-angle base 1. A first driving shaft of the two driving shafts is mounted on the right-angle base 1 through a bearing seat and is connected to an output part of the driving motor 2, for example, through a coupling 3 and the like. A second driving shaft of the two driving shafts is also mounted on the right-angle base 1 through a bearing seat to support the cylinder mold 7, thus forming a driven structure which is a driven shaft. Further, preferably, in order to adapt to the cylinder molds 7 with different lengths, a sliding rail 13 is provided on a side of the base where the second driving shaft, which is driven, is located. The sliding rail 13 is of a T-shaped structure. The bearing seat corresponding to the second driving shaft that is driven is slidingly arranged on the sliding rail 13 to adjust the position of the second driving shaft and achieve the sealing effect on the cylinder molds 7 with different lengths. In the mounting process, after the the second end of the cylinder mold 7 is connected and fixed with the second driving shaft that is driven, the corresponding bearing seat may be moved along the sliding rail 13 to make the second driving shaft, which is driven, pass through the corresponding bearing seat, and the corresponding bearing seat is fixed to the right-angle base 1 through a fixing mechanism. Preferably, as shown in FIG. 1, to facilitate distinguishing, two bearing seats and the two driving shafts respectively refer to a left bearing 4, a right bearing 10, a left rotating shaft 11 and a right rotating shaft 9. The annular fasteners respectively refer to a left annular fastener 5 in fit with the left rotating shaft 11 and a right annular fastener 8 in fit with the right rotating shaft 9.

The purpose of using the right-angle base 1 is to facilitate the vertical placement of the cylinder mold 7 after the first end of the cylinder mold 7 is connected and fixed to the first driving shaft through the first annular fastener, when the molten cladding glass 14 is poured; to facilitate to maintain the cylinder mold 7 and the two driving shafts in a vertical state at the beginning of the rotation; and to facilitate to stably lay the cylinder mold 7 and the two driving shafts flat at a later period. Thus, the right-angle base 1 is capable of providing support in both vertical and horizontal states.

A molding method for an optical fiber preform is further provided, which includes the following steps.

In step of preparing: a cylinder mold 7 is enabled to pass through a heating jacket 6, a first end of the cylinder mold 7 is connected and fixed to a first driving shaft through a first annular fastener, an end cylinder 12 is placed in the cylinder mold 7, the heating jacket 6 is turned on, heat preservation is conducted at 200-350° C. for 0.5-1 h, and a second driving shaft is placed in an electric furnace for heat preservation at 200-350° C. for 0.5-1 h.

In step of melting: cladding glass 14 and core glass 18 are successively melted in a melting furnace, where the cladding glass 14 is needed to be weighed quantitatively according to a core diameter of the optical fiber preform.

In step of pouring the molten cladding glass 14: the cylinder mold 7 with an opening at a second end of the cylinder mold 7 facing upwards after the first end of the cylinder mold 7 is connected and fixed is vertically placed, the molten cladding glass 14 is poured into the cylinder mold 7, the second driving shaft is taken out and connected and fixed to the second end of the cylinder mold 7 through a second annular fastener.

In step of rotating: the cylinder mold 7 and two driving shafts are maintained in a vertical state, and the two driving shafts are rotated at a rotational speed of 3000 r/min, the cylinder mold 7 and the two driving shafts are laid stably after waiting for 5-10 s, the cylinder mold 7 is continued to maintain at 200-350° C. for heat preservation, and the heating jacket 6 is turned off after the cylinder mold 7 is rotated for 3-60 min to make the cylinder mold 7 cool naturally. During rotation of the cylinder mold 7, an extrusion head 19 and a bottom die 20 may be put into the electric furnace for heat preservation at 400-600° C. for 0.5-1 h in advance.

In step of mounting an annular gasket 15 and a heat resisting cylinder 16: annular fasteners are dismounted at two sides of the cylinder mold 7, the cylinder mold 7 is taken out and placed horizontally, a cladding sleeve is pushed to the first end of the cylinder mold 7 to replace the end cylinder 12 with the annular gasket 15, and the annular gasket 15 is align with the first end of the cylinder mold 7. A narrow protrusion structure of the cladding sleeve is cut off to ensure that the two ends of the cladding sleeve are of opening structures, the heat resisting cylinder 16 is placed in the second end of the cylinder mold 7, and the whole cylinder mold 7 is placed in the electric furnace for heat preservation at 200-450° C. for 0.5-1 h.

In step of mounting a top die 17, the extrusion head 19 and the bottom die 20: the bottom die 20 is taken out from the electric furnace, the molten core glass 18 is poured into the bottom die 20, the extrusion head 19 is taken out from the electric furnace and is mounted on the bottom die 20, and the cylinder mold 7 is taken out and vertically arranged with the first end of the cylinder mold 7 which is provided with the annular gasket 15 facing upwards, the extrusion head 19 is mounted on the second end which is a bottom end of the cylinder mold 7, and the top die 17 is placed at the first end which is a top end of the cylinder mold 7.

In step of extruding: the cylinder mold 7 provided with the top die 17, the extrusion head 19 and the bottom die 20 is transferred to a hydraulic machine, the hydraulic machine is turned on and an extrusion speed is set to be 0.4-5 mm/s. The molten core glass 18 is reversely extruded into the cladding sleeve stably, and the extruding is stopped in response to the observation through the top die 17 that the molten core glass 18 overflows, a position of the hydraulic machine is remained unchanged, the cylinder mold 7 is taken out after waiting for 30-300 s, and the cylinder mold 7 is transferred into the electric furnace to be annealed for 3-6 h, and is cooled to room temperature in the electric furnace.

In step of taking out a product: the cylinder mold 7 is disassembled to obtain the optical fiber preform. An outer diameter of the optical fiber preform depends on an inner diameter of the cylinder mold 7, and a core diameter is mainly related to the weighing weight of the cladding glass 14.

For the non-chalcogenide mid-infrared glass such as fluoride glass, tellurate glass, the molding device and the molding method for the optical fiber preform provided by the present disclosure both have good applicability.

Adaptive changes made according to actual demands are both within the scope of protection of the present disclosure.

It needs to be noted that it is apparent to those skilled in the art that the present disclosure is not limited to the details of the exemplary embodiments described above and that the present disclosure can be achieved in other specific forms without departing from the spirit or essential features of the present disclosure. Therefore, the embodiments should be considered as illustrative rather than limiting from either point of view, the scope of the present disclosure is defined by the appended claims rather than by the foregoing description, and all changes falling within the meaning and scope of equivalency of the claims are therefore intended to be embraced in the present disclosure. Any reference numerals in the claims shall not be construed as limiting the claims involved.

Several examples are used for illustration of the principles and implementation methods of the present disclosure. The description of the embodiments is merely used to help illustrate the method and its core principles of the present disclosure. In addition, those of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. A molding device for an optical fiber preform, the molding device comprising a rotating mechanism, an extrusion mechanism, and a cylinder mold for preparing a hollow cladding sleeve, wherein the cylinder mold is of a cylindrical structure with two ends each having an opening, a corresponding one of two detachable plugging portions of the rotating mechanism is fitted with the opening, and the cylinder mold is rotationally connected to the rotating mechanism through the two plugging portions;

wherein the extrusion mechanism comprises a top die, an extrusion head and a bottom die, the top die is detachably connected to a first end of the two ends which is a top end of the cylinder mold vertically arranged, and the top die is formed with a through portion enabling a molten core glass inside the cladding sleeve to flow out; the extrusion head is located at a second end of the two ends which is a bottom end of the cylinder mold vertically arranged, and is provided with a feeding channel in communication with the cladding sleeve; the bottom die for pressing the molten core glass into the feeding channel is arranged at an inlet of the feeding channel; and a heat resisting cylinder is provided between the extrusion head and a bottom end of the cladding sleeve, and the heat resisting cylinder is formed with a flow guide channel for communicating the feeding channel and the cladding sleeve;

wherein the cylinder mold is connected to the rotating mechanism, and a heating jacket is arranged at a periphery of the cylinder mold;

wherein an end cylinder coaxial with the cylinder mold is arranged at an inner side of the cylinder mold, and an outer diameter of the end cylinder is matched with an inner diameter of the cylinder mold; and wherein the cylinder mold is connected to the extrusion mechanism, an annular gasket coaxial with the cylinder mold is arranged at an inner side of the top end of the cylinder mold, the annular gasket has same inner and outer diameters as the end cylinder, and the top die abuts against the annular gasket.

2. The molding device for the optical fiber preform according to claim 1, wherein an outer diameter of the heat resisting cylinder is matched with the inner diameter of the cylinder mold, and the flow guide channel and the cladding sleeve are coaxial and have same inner diameters.

3. The molding device for the optical fiber preform according to claim 2, wherein an inlet end of the feeding channel is arranged downwards, the bottom die is of a groove-shaped structure having an opening facing upwards, and an open end of the groove-shaped structure is slidingly sleeved outside a peripheral side of the inlet end of the feeding channel in a vertical direction.

4. The molding device for the optical fiber preform according to claim 3, wherein the inlet end of the feeding channel is of a tapered structure diminishing from bottom to top.

5. The molding device for the optical fiber preform according to claim 4, wherein a profile of a narrow end of the tapered structure is matched with an inner cavity of the cylinder mold and is inserted into the inner cavity of the cylinder mold, and the narrow end of the tapered structure has a same inner diameter as the cladding sleeve.

6. The molding device for the optical fiber preform according to claim 5, wherein the rotating mechanism comprises two driving shafts which are located at the two ends of the cylinder mold respectively and are provided coaxial with the cylinder mold; each of the two plugging portions comprises two annular flanges which are respectively provided on the cylinder mold and a corresponding one of the two driving shafts, and the two annular flanges are detachably and hermetically connected through an annular fastener.

7. A molding method for an optical fiber preform, the molding method comprising:

preparing: enabling a cylinder mold to pass through a heating jacket, connecting and fixing a first end of the cylinder mold to a first driving shaft of two driving shafts through a first annular fastener, and placing an end cylinder in the cylinder mold, turning on the heating jacket, performing heat preservation at 200-350° C. for 0.5-1 h, and placing a second driving shaft of the two driving shafts in an electric furnace for heat preservation at 200-350° C. for 0.5-1 h;

melting: melting cladding glass and core glass successively in a melting furnace, wherein the cladding glass is weighed quantitatively based on a core diameter of the optical fiber preform;

pouring the molten cladding glass: placing the cylinder mold with an opening at a second end of the cylinder mold facing upwards vertically after the first end of the cylinder mold is connected and fixed, pouring the molten cladding glass into the cylinder mold, taking out the second driving shaft, and connecting and fixing the second driving shaft to the second end of the cylinder mold through a second annular fastener;

rotating: maintaining the cylinder mold and the two driving shafts in a vertical state, and rotating the two driving shafts at a rotational speed of 3000 r/min, waiting for 5-10 s and laying the cylinder mold and the two driving shafts stably, continuing to keep the cylinder mold for heat preservation at 200-350° C., and turning off the heating jacket to enable the cylinder mold to be cool naturally after the cylinder mold is rotated for 3-60 min, wherein, upon rotation of the cylinder mold, a bottom die and an extrusion head are put into the electric furnace for heat preservation at 400-600° C. for 0.5-1 h in advance;

mounting an annular gasket and a heat resisting cylinder: dismounting the first annular fastener and the second annular fastener at two sides of the cylinder mold, taking out the cylinder mold and placing the cylinder mold horizontally, pushing a cladding sleeve to the first end of the cylinder mold to replace the end cylinder with the annular gasket and enabling the annular gasket align with the first end of the cylinder mold, cutting off a narrow portion of the cladding sleeve to ensure that two ends of the cladding sleeve are of opening structures; and placing the heat resisting cylinder in the second end of the cylinder mold, and then placing the cylinder mold as a whole in the electric furnace for heat preservation at 200-450° C. for 0.5-1 h;

mounting a top die, the extrusion head and the bottom die: taking out the bottom die from the electric furnace, pouring the molten core glass into the bottom die, taking out the extrusion head from the electric furnace and mounting the extrusion head on the bottom die, and taking out the cylinder mold and enabling the first end of the cylinder mold which is provided with the annular gasket to face upwards, placing the cylinder mold wholly and vertically, mounting the extrusion head at the second end which is a bottom end of the cylinder mold, and placing the top die at the first end which is a top end of the cylinder mold;

extruding: transferring the cylinder mold installed with the top die, the extrusion head and the bottom die to a hydraulic machine, turning on the hydraulic machine and setting an extrusion speed to be 0.4-5 mm/s; extruding the molten core glass reversely into the cladding sleeve stably; stopping extruding in response to observation through the top die that the molten core glass overflows; remaining a position of the hydraulic machine unchanged, waiting for 30-300 s and taking out the cylinder mold; and transferring the cylinder mold into the electric furnace to be annealed for 3-6 h, and cooling the cylinder mold to room temperature in the electric furnace; and taking out a product: disassembling the cylinder mold and taking out the optical fiber preform.

* * * * *